(No Model.)

R. M. KEATING.
TIRE FOR WHEELS.

No. 525,081. Patented Aug. 28, 1894.

Witnesses

Inventor
Robert M. Keating
by Francis M. Wright
Assoc. Attorney

UNITED STATES PATENT OFFICE.

ROBERT M. KEATING, OF SPRINGFIELD, MASSACHUSETTS.

TIRE FOR WHEELS.

SPECIFICATION forming part of Letters Patent No. 525,081, dated August 28, 1894.

Application filed December 13, 1893. Serial No. 493,602. (No model.)

*To all whom it may concern:*

Be it known that I, ROBERT M. KEATING, a citizen of the United States of America, residing in Springfield, in the county of Hampden and State of Massachusetts, have invented new and useful Improvements in Rims and Tires for Wheels, of which the following is a specification, reference being had to the accompanying drawings and letters of reference marked thereon.

My invention relates especially to rims and tires for bicycles, and has for its object a construction whereby the tire may be maintained in the desired position upon the rim to prevent "crawling," while at the same time it may be quickly and easily removed and replaced in position upon the rim.

I accomplish the objects of my invention by the construction herein shown.

Figure 1:
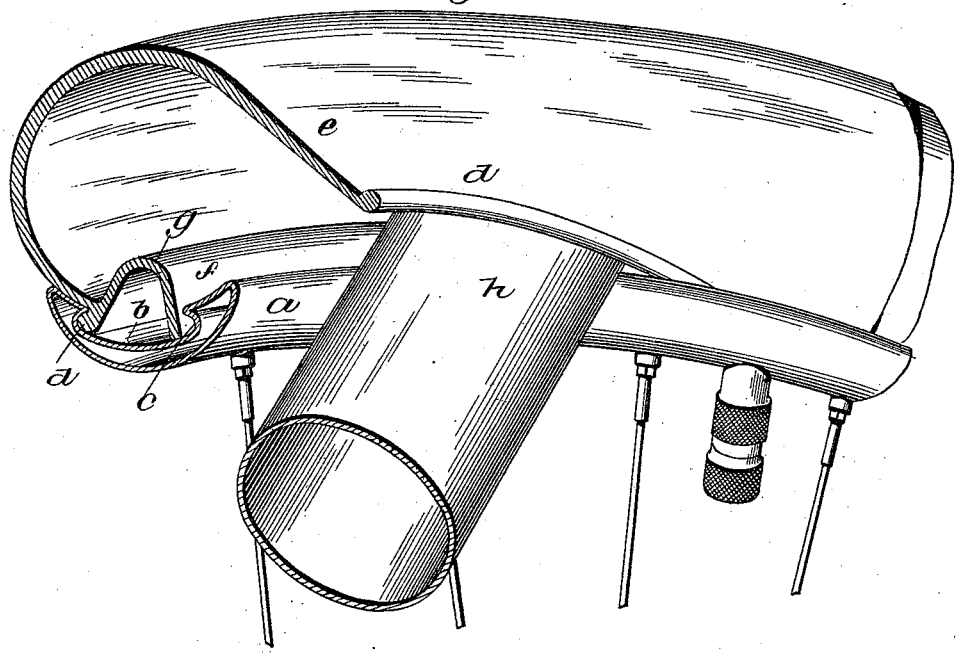
Figure 2:
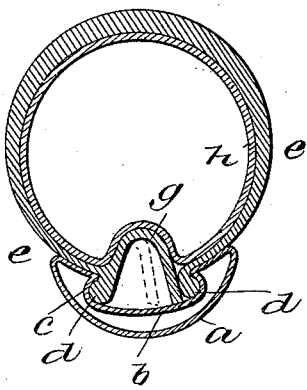
Figure 3:
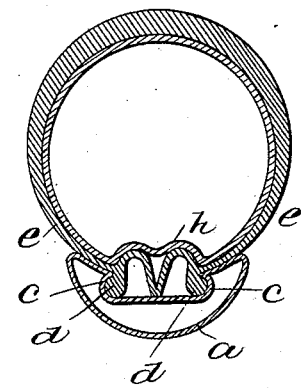
Figure 4:
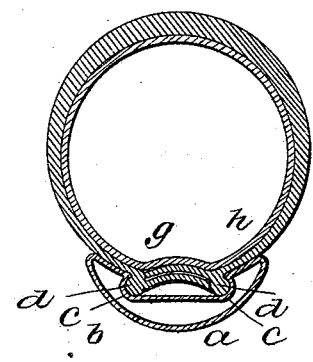
Figure 5:
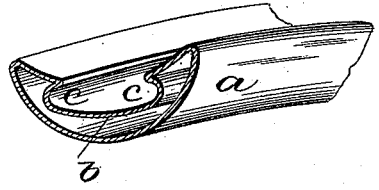

In the accompanying drawings in which like letters of reference indicate like parts, Figure 1 is a perspective view of the rim and tire. Fig. 2 is a transverse sectional view of the rim and tire. Fig. 3 is a view showing the holding piece formed integral with both edges of the tire, and Fig. 4 illustrates a like construction excepting that the holding pieces are shorter than shown in Fig. 3. Fig. 5 is a perspective view of the rim detached.

In detail $a$ indicates the outer wall of the rim; $b$ indicates the inner wall; $c$ indicates annular recesses in the rim; $d$ indicates enlargements or ribs upon the edges of the tire cover; $e$ indicates the exposed portion of the cover; $g$ indicates the holding piece made integral with the tire cover and $h$ indicates the inner tube.

The construction and operation are as follows:—The rim is formed as shown in the drawings with annular recesses $c$ the overhanging walls of which recesses project toward each other. The outer portion of the tire or cover is formed with ribs $d$ upon its edges adapted to enter said annular recesses, and these ribs or enlargements are made nonelastic by the insertion of wire or by a suitable employment of fabric which will overcome the elasticity which would result were they made of rubber alone. The inner tube may be of the ordinary construction. When therefore all the parts are in position as indicated in Fig. 2 and the inner tube is inflated its lower portion will bear upon the holding piece $g$ and cause the deflection of its sides, forcing them against the inner surfaces of the edges of the cover, and thus forcing the ribs $d$ into the annular recesses $c$ and preventing the escape of the ribs from these recesses, and as these ribs are nonelastic all tendency to "creep" or "crawl" of the tire in the rim is avoided. When however it is desired to reach the inner tube for the purpose of repair or for any reason it is desired to dismount the parts, it simply becomes necessary to relieve the inner tube from pressure, when either of the walls of the cover may be forced inwardly, and the rib $d$ removed from its recess, thus allowing it to be sprung outwardly and thus allowing the inner tube to be removed in whole or in part. As a modification of this form of construction, I have illustrated in Fig. 3 a cover $e$ provided with two holding pieces, one upon each edge, which pieces curve upwardly and then downwardly and meet at their edges and bear against each other, thus forcing the ribs apart, and when pressure is applied by the expansion of the inner tube, the same result is obtained. In Fig. 4 I illustrate another modification wherein the holding pieces are made of less length than in the other illustrations, they however, are of sufficient length to occupy at all times a curved position as shown, and the tendency when pressure is applied in the inner tube is to separate the ribs $d$ and force them into the annular recesses in the rim.

Having, therefore, described my invention, what I claim, and desire to secure by Letters Patent, is—

The combination of a rim having annular recesses, with a tire cover having ribs adapted to enter said recesses and having integral therewith an arched portion extending from one of said ribs inwardly into the tire recess, the outer edge of such portion contacting with the other edge of the tire cover, and an inflatable inner tube resting upon said arched portion, substantially as described.

ROBERT M. KEATING.

Witnesses:
ALLEN WEBSTER,
EMIL NOHRLEY.